US009333968B2

(12) United States Patent
Pettersson et al.

(10) Patent No.: US 9,333,968 B2
(45) Date of Patent: May 10, 2016

(54) METHOD FOR GEARCHANGE IN A HYBRID VEHICLE

(71) Applicant: SCANIA CV AB, Södertälje (SE)

(72) Inventors: Niklas Pettersson, Stockholm (SE);
Mikael Bergquist, Huddinge (SE);
Johan Lindström, Nyköping (SE);
Anders Kjell, Ekerö (SE); Mathias Björkman, Tullinge (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/410,624

(22) PCT Filed: Jun. 26, 2013

(86) PCT No.: PCT/SE2013/050777
§ 371 (c)(1),
(2) Date: Dec. 23, 2014

(87) PCT Pub. No.: WO2014/003659
PCT Pub. Date: Jan. 3, 2014

(65) Prior Publication Data
US 2015/0203098 A1    Jul. 23, 2015

(30) Foreign Application Priority Data

Jun. 27, 2012    (SE) ..................... 1250720

(51) Int. Cl.
*B60W 30/19*    (2012.01)
*B60W 20/00*    (2016.01)
(Continued)

(52) U.S. Cl.
CPC .............. *B60W 20/108* (2013.01); *B60K 6/365* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS

| 2003/0166429 A1 | 9/2003 | Tumback |
| 2006/0169503 A1* | 8/2006 | Oliver et al. ................. 180/65.2 |

(Continued)

FOREIGN PATENT DOCUMENTS

| DE | 10 2006 003725 A1 | 8/2007 |
| DE | 10 2009 002918 A1 | 11/2010 |

(Continued)

OTHER PUBLICATIONS

International Search Report dated Oct. 25, 2013 issued in corresponding International patent application No. PCT/SE2013/050777.

(Continued)

*Primary Examiner* — Justin Holmes
(74) *Attorney, Agent, or Firm* — Ostrolenk Faber LLP

(57) ABSTRACT

A method for gearchange in a gearbox of a vehicle driving, said vehicle having a propulsion system comprising a combustion engine with an output shaft (2a), a gearbox (3) with an input shaft (3a), an electric machine (9) comprising a stator and a rotor, and a planetary gear comprising a sun gear (10), a ring gear (11) and a planet wheel carrier (12). The gearchange is carried out with the components of the planetary gear allowed to rotate with different rotational speeds and is finished by interlocking them. The combustion engine is controlled with respect to rotational speed during the gearchange towards the rotational speed required for the interlocking.

11 Claims, 4 Drawing Sheets

(51) Int. Cl.
  *B60K 6/365* (2007.10)
  *B60W 10/06* (2006.01)
  *B60W 10/08* (2006.01)
  *B60W 10/11* (2012.01)
  *F16H 61/04* (2006.01)
  *B60W 10/02* (2006.01)

(52) U.S. Cl.
  CPC ............... *B60W 10/08* (2013.01); *B60W 10/11* (2013.01); *B60W 20/00* (2013.01); *B60W 30/19* (2013.01); *F16H 61/04* (2013.01); *F16H 61/0403* (2013.01); *B60Y 2200/92* (2013.01); *B60Y 2300/72* (2013.01); *B60Y 2400/421* (2013.01); *F16H 2061/0422* (2013.01); *F16H 2306/46* (2013.01); *F16H 2306/48* (2013.01); *F16H 2306/50* (2013.01); *Y02T 10/6286* (2013.01); *Y10S 903/93* (2013.01); *Y10T 477/23* (2015.01)

(56) References Cited

U.S. PATENT DOCUMENTS

| | | | |
|---|---|---|---|
| 2006/0169504 A1* | 8/2006 | Oliver et al. | 180/65.2 |
| 2007/0207896 A1* | 9/2007 | Radich | 477/107 |
| 2009/0069147 A1* | 3/2009 | Tabata et al. | 477/3 |
| 2011/0136607 A1* | 6/2011 | Samie et al. | 475/2 |
| 2011/0160947 A1* | 6/2011 | Ideshio et al. | 701/22 |

FOREIGN PATENT DOCUMENTS

| | | |
|---|---|---|
| EP | 1 319 546 A1 | 6/2003 |
| SE | 1051384-4 | 6/2012 |

OTHER PUBLICATIONS

International Preliminary Report on Patentability dated Sep. 25, 2014 issued in corresponding International patent application No. PCT/SE2013/050777.

* cited by examiner

METHOD FOR GEARCHANGE IN A HYBRID VEHICLE

CROSS-REFERENCE TO RELATED APPLICATIONS

The present application is a 35 U.S.C. §§371 National Phase conversion of PCT/SE2013/050777, filed Jun. 26, 2013, which claims priority of Swedish Patent Application No. 1250720-8, filed Jun. 27, 2012, the contents of which are incorporated by reference herein. The PCT International Application was published in the English language.

FIELD OF THE INVENTION AND PRIOR ART

The present invention relates to a method for gearchange in a gearbox of a vehicle.

The invention is especially but not exclusively directed to carrying out such a method for motor vehicles in the form of wheeled utility vehicles, especially heavy such vehicles, such as trucks and buses.

Thus, the invention relates to method for gearchange in a hybrid vehicle, in which such a vehicle is generally a vehicle which may be driven by a primary engine, here a combustion engine, and a secondary engine, here an electric machine. The electric machine is suitably provided with means for storing energy, such as a battery or a capacitor for storing electric energy, and regulating equipment for regulating the flow of electrical energy between said storing means and the electric machine. The electric machine may by this operate as a motor or a generator depending upon the state of operation of the vehicle. When the vehicle is braked, the electric machine generates electrical energy, which may be stored, and the electrical energy stored may later be utilized for, for example, driving the vehicle.

The utilization of a conventional clutch mechanism disconnecting the input shaft of the gearbox with respect to the combustion engine during the gearchanging process in the gearbox results in disadvantages, such as heating of the discs of the clutch mechanism, which results in an increased fuel consumption and wear of the clutch discs. Considerable losses are then also created when starting the vehicle. Furthermore, a conventional clutch mechanism is comparatively heavy and costly. It requires also a comparatively large space in the vehicle. Friction losses are also created when using a hydraulic converter/torque transformer usually used in automatic gearboxes. The conventional clutch mechanism and said disadvantages associated therewith may be avoided by providing a propulsion system for the vehicle in which the output shaft of the combustion engine, the rotor of the electric machine and the input shaft of the gearbox are interconnected by a planetary gear. A vehicle having a propulsion system of this type is known through EP 1 319 546.

There is of course an ongoing attempt to improve the way to drive a vehicle having such a propulsion system with respect to energy efficiency and to regenerate as much as possible of the brake energy when braking the vehicle.

SUMMARY OF THE INVENTION

The object of the present invention is to provide a method of the type defined in the introduction considering the attempt mentioned above.

By having the planetary gear in the released position during the gearchange, this change may take place with a shorter torque interruption than if the planetary gear had been in the locked position. The duration of such a torque interruption in the drivetrain of the vehicle is reduced further by the fact that synchronizing of the combustion engine for later interlocking of the components of the planetary gear has started already in connection with the control of the electric machine for disengaging the existing gear. The fact that the combustion engine has much higher moment of inertia than the electric machine and that the synchronizing the engines will take a longer time is considered.

According to an embodiment of the invention, the method is carried out for a vehicle having a propulsion system with the sun gear as the first component and the ring gear as the third component. Such a propulsion system is described in unpublished SE 1051384-4. It has a number of advantages with respect to a propulsion system according to EP 1 319 546 mentioned above, which has the ring gear as the first component and the sun gear as the third component. A compact construction being easy to build in in spaces already existing for drivetrains (propulsion systems) having clutch mechanisms instead of planetary gears is obtained by connecting the electric machine with the ring gear and connecting the output shaft of the combustion engine with the sun gear. A hybridized gearbox may by this be made size and weight compatible with a standard gearbox and standardized interfaces may be maintained. This means that the weight increase normally associated with a hybridization may be reduced considerably. Another advantage is that a connection of the electric machine with the ring gear means a higher possible brake torque through this than if the electric machine were instead be connected to the sun gear.

According to another embodiment of the invention, during carrying out a step toward synchronized rotational speed, the time remaining until said synchronized rotational speed of the input shaft of the gearbox has been obtained is calculated and this time is compared with an expected time consumption for said gearengaging procedure, and the gearengaging procedure is started when said time is equal to or has become shorter than said time consumption. This achieves a new gear being engaged substantially at the moment in which the synchronization is completed and the gear may be engaged, which minimises torque interruption in the drivetrain.

According to another embodiment of the invention a constant torque is applied through the electric machine on the input shaft of the gearbox. Application of a constant torque for accelerating or retarding the input shaft of the gearbox towards the synchronous rotational speed results in a simplified control.

According to another embodiment of the invention the method is started when the vehicle is driving forward with the locking means in the locking position and comprises the following steps carried out before controlling the combustion engine:

1) controlling the electric machine, for obtaining a torque balance in the planetary gear, to produce torque corresponding to the product of on one hand the propulsion system torque requested and on the other the transmission ratio of the planetary gear and at the same time controlling the combustion engine to produce a second torque towards obtaining a total zero torque applied on the input shaft of the gearbox, and
2) transferring the locking means to the releasing position when torque balance exists in the planetary gear.

When driving a vehicle of this type at normal/higher speeds/higher power outputs it is generally energy efficient to drive with the planetary gear in the locked position and in this embodiment of the invention the method is accordingly started with the planetary gear in locked position and finished with the planetary gear in locked position.

According to another embodiment of the invention it is the sun gear and the planet wheel carrier which are interlocked through said locking means. The transfer of the locking means between the locking position and the releasing position may by this be reliably achieved by simple means. Less torque is by this transferred through the planetary gear wheels. Only the torque of the electric machine is transferred through these gear wheels.

According to another embodiment of the invention a rotational speed is calculated which, for the existing speed of the vehicle, the input shaft of the gearbox would have if the gear of the gearbox to be engaged would be engaged. The combustion engine may by this be directly controlled towards that rotational speed.

The invention also relates to a computer program, a computer program product, an electronic control unit and a vehicle for controlling these functions.

Other advantageous features as well as advantages of the invention appear from the description following below.

BRIEF DESCRIPTION OF THE DRAWINGS

With reference to appended drawings, below follows a specific description of an embodiment of the invention cited as an example.

In the drawings.

DETAILED DESCRIPTION OF AN EMBODIMENT OF THE INVENTION

Figure 1:
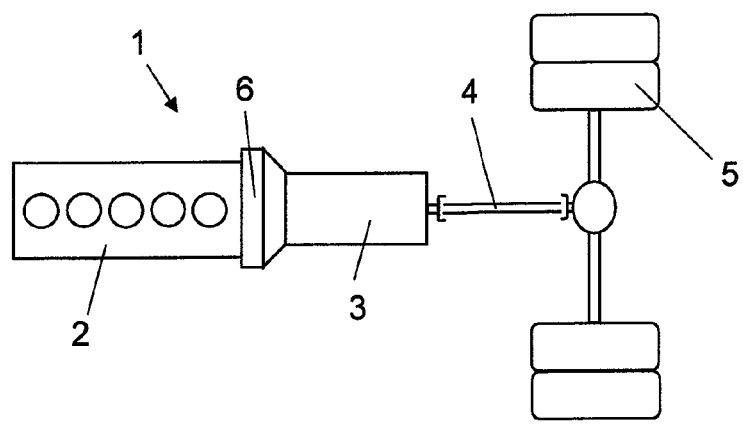
FIG. 1 is a very simplified view of a drivetrain of a vehicle for which a method according to the invention may be carried out.
Figure 2:
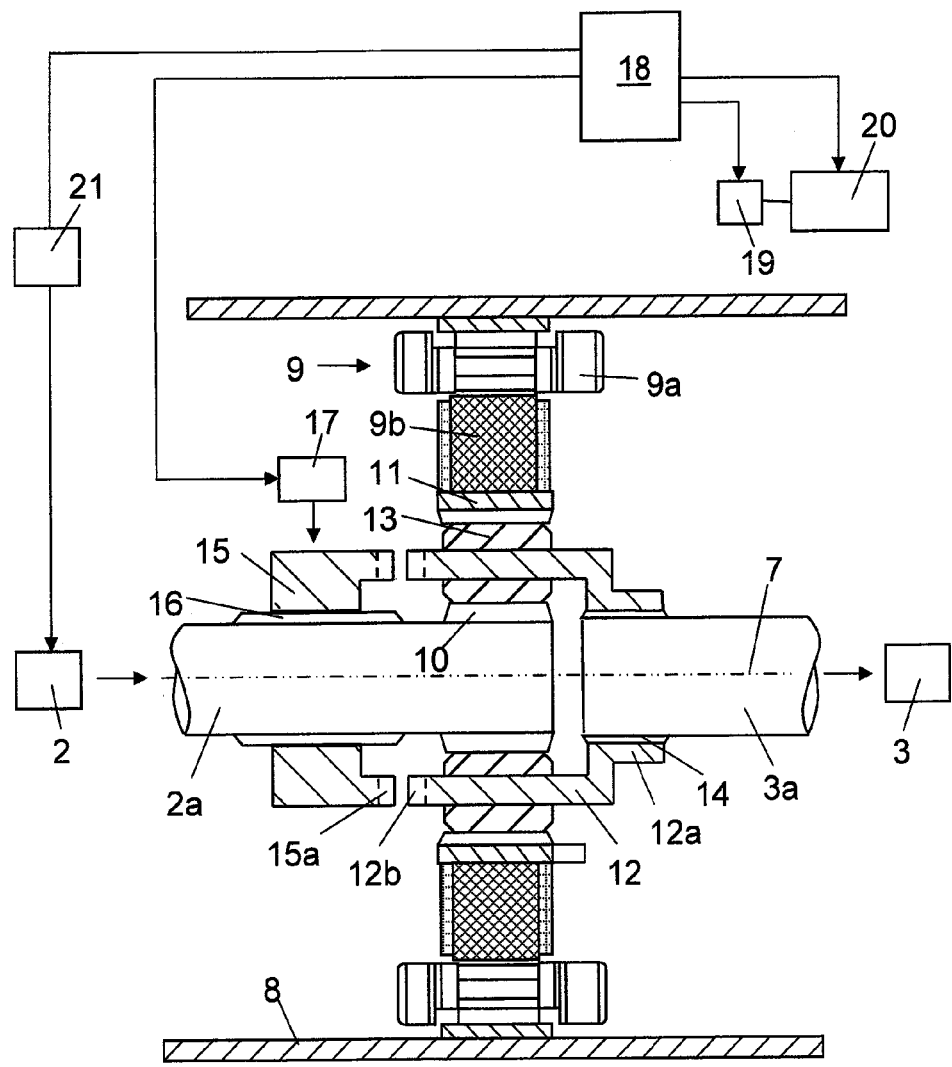
FIG. 2 is a simplified but more detailed view of a part of a propulsion system.

FIG. 1 shows a drivetrain for a heavy vehicle 1. The drivetrain comprises a combustion engine 2, a gearbox 3, a number of drive shafts 4 and drive wheels 5. The drivetrain has between the combustion engine 2 and the gearbox 3 an intermediate portion 6. FIG. 2 shows more detail of the components in the intermediate portion 6. The combustion engine 2 is provided with an output shaft 2a and the gearbox 3 with an input shaft 3a in the intermediate portion 6. The output shaft 2a of the combustion engine is arranged coaxially with respect to the input shaft 3a of the gearbox. The output shaft 2a of the combustion engine and the input shaft 3a of the gearbox are arranged to rotate around a rotation axis 7 in common. The intermediate portion 6 comprises a housing 8 enclosing an electric machine 9 and a planetary gear. The electric machine 9 comprises as usual a stator 9a and a rotor 9b. The stator 9a comprises a stator core secured in a suitable way on the inner side of the housing 8. The stator core comprises stator windings. The electric machine 9 is adapted to in certain operation situations utilize electric energy stored for supplying drive power to the input shaft 3a of the gearbox and in other operation situations utilize kinetic energy of the input shaft 3 of the gearbox for generating and storing electric energy.

The planetary gear is arranged substantially radially internally of the stator 9a and the rotor 9b of the electric machine. The planetary gear comprises as usual a sun gear 10, a ring gear 11 and a planet wheel carrier 12. The planet wheel carrier 12 carries a number of gear wheels 13 being rotatably arranged in a radial space between the teeth of the sun gear 10 and the ring gear 11. The sun gear 10 is secured to a circumferential surface of the output shaft 2a of the combustion engine. The sun gear 10 and the output shaft 2a of the combustion engine rotate as a unit with a first rotational speed $n_1$. The planet wheel carrier 12 comprises a fastening portion 12a fastened to a circumferential surface of the input shaft 3a of the gearbox by means of a splined connection 14. The planet wheel carrier 12 and the input shaft 3a of the gearbox may by means of this connection rotate as a unit with a second rotational speed $n_2$. The ring gear 11 comprises an external circumferential surface onto which the rotor 9b is secured. The rotor 9b and the ring gear 11 form a rotatable unit rotating with a third rotational speed $n_3$.

The propulsion system comprises a locking means by the fact that the output shaft 2a of the combustion engine is provided with a displaceable coupling member 15. The coupling member 15 is fastened to the output shaft 2a of the combustion engine by means of a splined connection 16. The coupling member 15 is in this case fixed against rotation to the output shaft 2a of the combustion engine and displaceable in the axial direction on the output shaft 2a of the combustion engine. The coupling member 15 comprises a coupling portion 15a connectable to a coupling portion 12b of the planet wheel carrier 12. A displacing member 17 schematically shown is adapted to displace the coupling member 15 between a first position in which the coupling portions 15a, 12b are not mutually engaged corresponding to a releasing position of the locking means and a second position in which the coupling portions 15a, 12b are mutually engaged corresponding to a locking position of the locking means. The output shaft 2a of the combustion engine and the input shaft 3a of the gearbox will in this locking position be interlocked and these and the rotor of the electric machine will rotate with the same rotational speed. This state may be called locked planet. The locking mechanism may also comprise a sleeve provided with first splines which in the releasing position engage second splines on a first component of the planetary gear and in the locking position engage third splines on a second component of the planetary gear. The first component is in this case preferably the planet wheel carrier and the second component the sun gear. The locking mechanism may then be a sleeve with a ring shape substantially concentrically enclosing the planet wheel carrier.

An electric control unit 18 is designed to control the displacing member 17. The control unit 18 is also configured to decide on which occasions the electric machine shall operate as a motor and on which occasions it shall operate as a generator. The control unit 18 may for deciding this receive current information about suitable operation parameters. The control unit 18 may be a computer with software for this task. The control unit 18 controls a regulating equipment 19 schematically shown, which regulates the flow of electric energy between a hybrid battery 20 and the stator windings 9a of the electric machine. On occasions when the electric machine 9 operates as a motor, electric energy stored is supplied from the hybrid battery 20 to the stator 9a. On occasions on which the electric machine operates as a generator, electric energy is supplied from the stator 9a to the hybrid battery 20. The hybrid battery 20 delivers and stores electric energy with a voltage on the order of 200-800 volts. Since the intermediate portion 6 between the combustion engine 2 and the gearbox 3 in a vehicle is restricted, it is required that the electric machine 9 and the planetary gear constitute a compact unit. The components 10, 11, 12 of the planetary gear are here arranged substantially radially internally of the stator 9a of the electric machine. The rotor 9b of the electric machine, the ring gear 11 of the planetary gear, the output shaft 2a of the combustion engine and the input shaft 3a of the gearbox are here arranged to rotate around a rotation axis 7 in common. The electric machine 9 and the planetary gear occupy due to such a design a comparatively small space. The vehicle 1 is provided with a motor control function 21 through which the rotational speed $n_1$ of the combustion engine 2 may be regulated. The control unit 18 thus has a possibility to activate the motor control function 21 and create a state of zero torque in the gearbox when gears in the gearbox 3 are engaged and disengaged. The propulsion system may of course be controlled by several different control units instead of being controlled by one single control unit 18.

Figure 4:
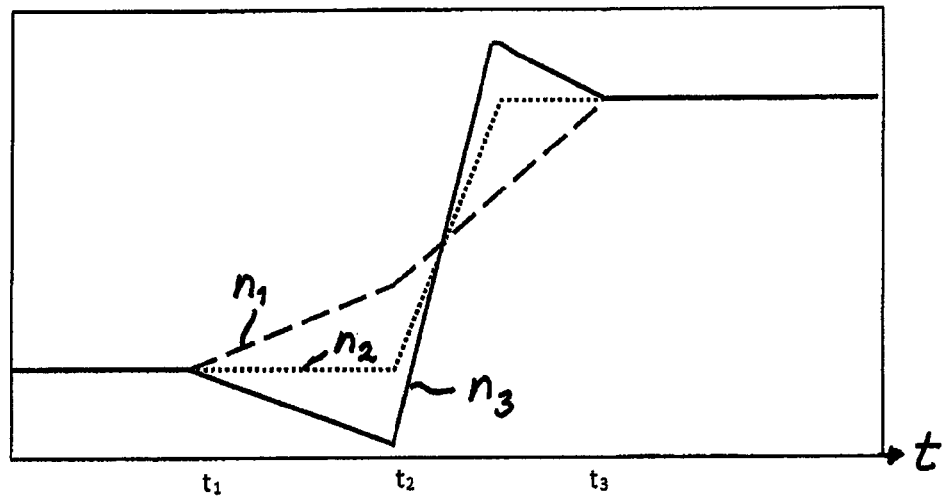
FIG. 4 shows how the rotational speed for the components (combustion engine shaft, rotor of electric machine and input shaft of the gearbox) connected to the planetary gear of the propulsion system according to FIG. 2 vary over time when carrying out a method according to an embodiment of the invention for gearchange of the vehicle driving.
Figure 5:
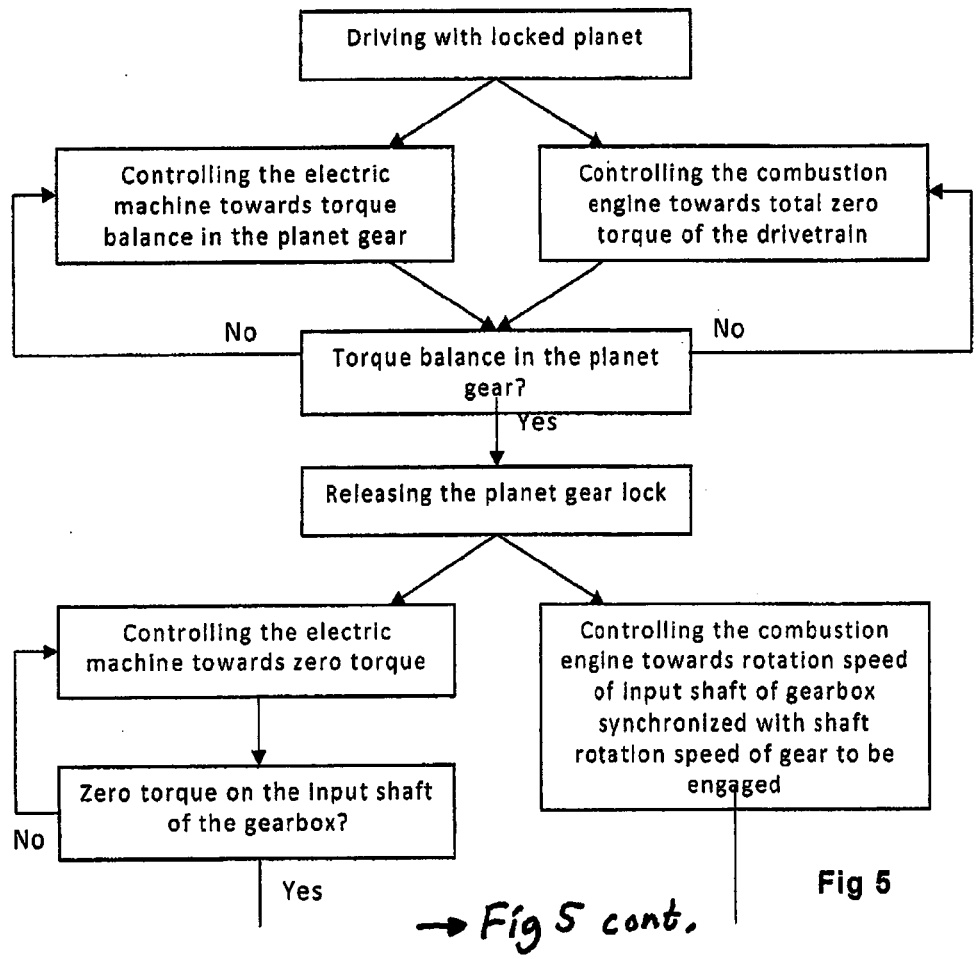
FIG. 5 is a flow chart illustrating a method according to an embodiment of the invention.
Figure 5:
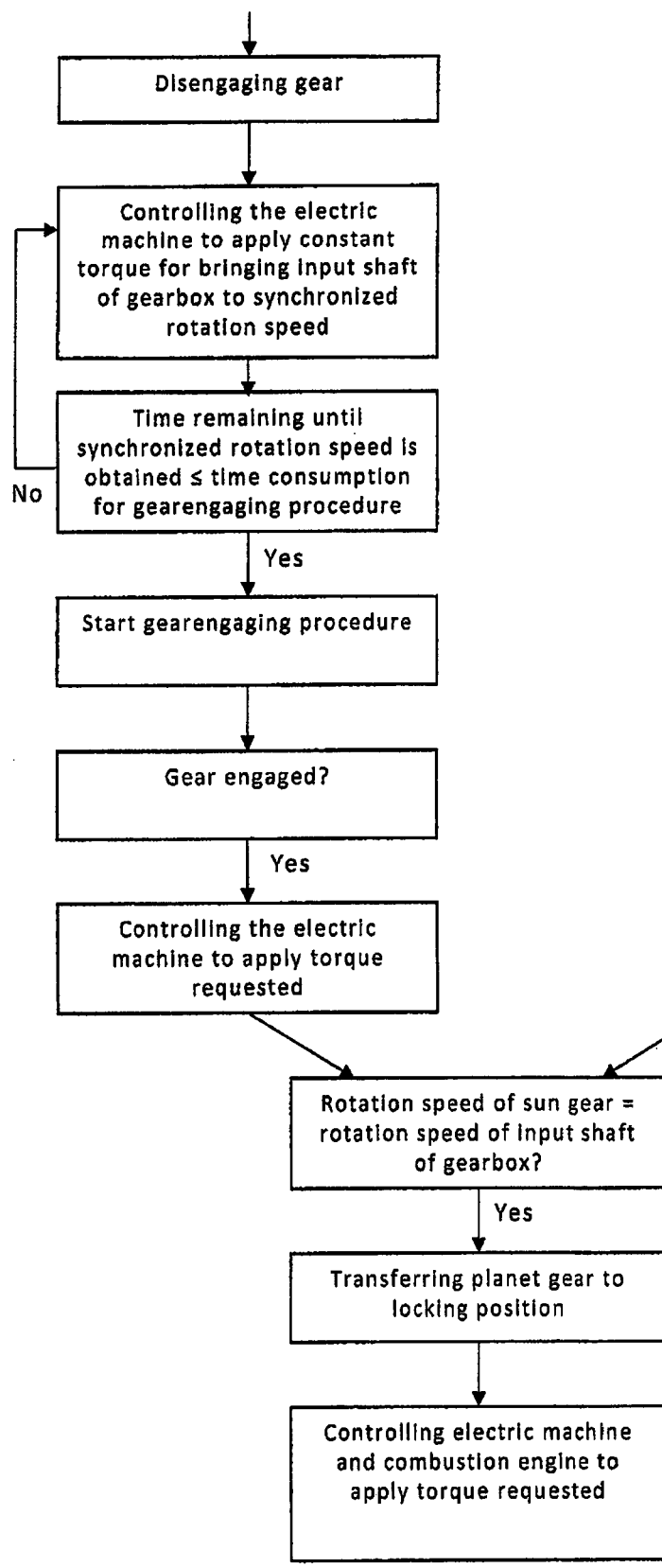

FIG. 5 shows a flow chart illustrating a method according to an embodiment of the present invention for gearchange in a vehicle driving, in which the vehicle has a propulsion system of the type shown in FIG. 2. FIG. 4, shows the development of the rotational speeds of the output shaft of the combustion engine, the input shaft of the gearbox and the rotor of the electric machine $n_1$, $n_2$ and $n_3$, respectively, plotted versus the time t for carrying out this method. The rotational speeds are in FIG. 4 illustrated when changing to a lower gear, but the method according to the invention is of course also applicable to a change up.

The vehicle is driven with the locking means in the locking position when the method is started. This means that all three components of the planetary gear rotate with the same rotational speed. A need to change gear in the vehicle is then detected.

The method is then started by the control unit 18, which determines the torque ramp to be applied by the total propulsion system on the input shaft of the gearbox. The torque ramp is initiated with the torque applied on the input shaft of the gearbox when the gearchanging procedure is started and runs towards zero torque at a speed adapted to the features of the vehicle and gear changing behavior desired. The electric machine is controlled to produce a torque creating torque balance in the planetary gear. Torque balance exists when the electric machine produces a torque corresponding to the product of on one hand the total propulsion system torque and on the other the transmission ratio of the planetary gear at the same time as the combustion engine produces a torque corresponding to the product of on one hand the total propulsion system torque and on the other (1−the transmission ratio of the planetary gear). The combustion engine is controlled to produce a torque that is the same as the total torque aimed at, minus the torque produced by the electric machine to at the same time obtain torque balance and a total drive torque following the torque ramp aimed at. The transmission ratio of the planetary gear is in the present case with the sun gear connected to the output shaft of the combustion engine and the ring gear connected to the rotor of the electric machine the number of teeth of the ring gear/(the number of teeth of the sun gear+the number of teeth of the ring gear).

The following method may as an alternative replace the above sequence: the combustion engine is controlled so as to create torque balance in the planetary gear. The combustion engine is then controlled to produce a torque equal to the drive torque aimed at multiplied with (1−the transmission ratio of the planetary gear). The electric machine is controlled to produce the torque equal to the total drive torque aimed at, minus the torque produced by the combustion engine to at the same time obtain a torque balance and a total drive torque following the torque ramp aimed at.

Torque balance has been obtained in the planetary gear at the time $t_1$ and the locking means is then transferred to the releasing position by displacing the coupling member 15.

At this time $t_1$ control of the combustion engine is started towards the rotational speed calculated to be correct for the input shaft 3a of the gearbox so as to be synchronized with the shaft rotational speed for a gear to be engaged in the gearbox for the existing speed of the vehicle. The electric machine is at the same time controlled together with the combustion engine toward applying a zero torque on the input shaft of the gearbox. At the time $t_2$, zero torque, i.e. a state without torque has been obtained, and the gear is disengaged. The electric machine is at the same time controlled to produce a constant torque so as to bring the input shaft of the gearbox to a rotational speed which for the existing speed of the vehicle is synchronized with the shaft rotational speed for the gear to be engaged in the gearbox. It is during the time for doing this calculated how much time remains until the synchronized rotational speed has been obtained and this time is compared with the calculated time consumption for a gearengaging procedure. When said time is equal to or shorter than said time consumption, the gearengaging procedure is started. Once the gear is engaged the electric machine is controlled to apply the propulsion system torque requested.

At the time $t_3$ the rotational speed $n_1$ of the sun gear has reached the rotational speed $n_2$ of the input shaft 3a (the planet wheel carrier) of the gearbox, and the locking means is then controlled to transfer the planetary gear to the locking position by displacing the coupling member 15. The electric machine 9 and the combustion engine are after that controlled to apply a torque requested from each of them on the input shaft 3a of the gearbox, and the gearchanging method is finished when this has been obtained.

Computer program code for implementing a method according to the invention is suitably included in a computer program which is readable into a non-transitory internal memory of a computer, such as the internal memory of an electronic control unit of a motor vehicle. Such a computer program is suitably provided through a computer program product comprising a data storing medium readable by an electronic control unit, which data storing medium has the computer program stored thereon. Said non-transitory data storing medium is for example an optical data storing medium in the form of a CD-ROM-disc, a DVD-disc, etc., a magnetic data storing medium in the form of a hard disc, a diskette, a tape etc., or a Flash memory or a memory of the type ROM, PROM, EPROM or EEPROM.

Figure 3:
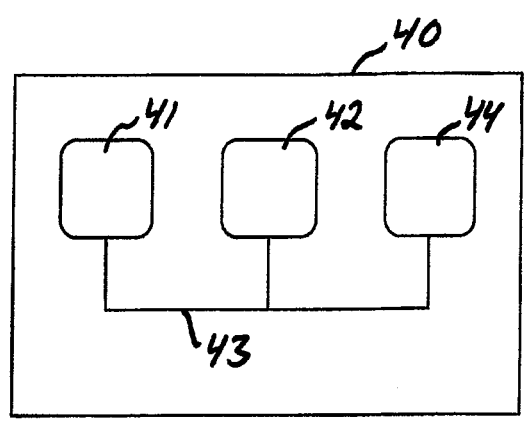
FIG. 3 is a principle sketch of an electronic control unit for implementing a method according to the invention.

FIG. 3 illustrates very schematically an electronic control unit 40 comprising an execution means 41, such as a central processor unit (CPU), for executing a computer program. The execution means 41 communicates with a memory 42, for example of the type RAM, through a data bus 43. The control unit 40 comprises also a non-transitory data storing medium 44, for example in the form of a Flash memory or a memory of the type ROM, PROM, EPROM or EEPROM. The execution means 41 communicates with the data storing medium 44 through a data bus 43. A computer program comprising computer program code for implementing a method according to the invention, for example in accordance with the embodiment illustrated in FIG. 5, is stored on the data storing medium 44.

The invention is of course not in any way restricted to the embodiments described above, but many possibilities to modifications thereof would be apparent to a person with skill in the art without departing from the scope of the invention as defined in the appended claims.

The locking means may be designed to interlock any two of said three components.

A transmission could be arranged between the rotor and the ring gear and also between the output shaft of the combustion engine and the sun gear, such as upstream of the shaft shown in the figures to be connected to the sun gear. The transmission last mentioned could also be formed by a variable gear.

It is also conceivable that the method is carried out for a vehicle having the ring gear as the first component and the sun gear as the third component, although the opposite would probably often be preferred through the advantages thereof mentioned above.

The invention claimed is:

1. A method for gearchange in a gearbox of a vehicle while driving, wherein the vehicle has a propulsion system comprising a combustion engine with an output shaft, a gearbox with an input shaft, an electric machine comprising a stator and a rotor, and a planetary gear comprising three components in the form of a sun gear, a ring gear and a planet wheel carrier, the output shaft of the combustion engine being connected to a first component of the components of the planetary gear so that rotation of the output shaft causes rotation of the first component, the input shaft of the gearbox being connected to a second component of the components of the planetary gear so that rotation of the input shaft causes rotation of the second component, and the rotor of the electric machine being connected with a third component of the components of the planetary gear so that rotation of the rotor causes rotation of the third component;

the propulsion system further comprising a locking mechanism movable between a locking position in which two of the components are interlocked, so that the three components rotate with the same rotational speed, and a releasing position in which the components are allowed to rotate with different rotational speeds;

the method comprising:

placing the locking mechanism in the releasing position, and then:

a) controlling the combustion engine to bring the first component toward the rotational speed that the input shaft of the gearbox shall have, so as to synchronize an existing speed of the vehicle with a shaft rotational speed for a gear to be engaged in the gearbox;

b) controlling the electric machine towards a state in which the electric machine together with the combustion engine applies a zero torque to the input shaft of the gearbox;

c) disengaging the gear engaged in the gearbox when the zero torque has been obtained;

d) controlling the electric machine to apply a torque to the input shaft of the gearbox for bringing the input shaft to a rotational speed which, for the existing speed of the vehicle, is synchronized with a shaft rotational speed for the gear to be engaged in the gearbox;

e) during performance of step d), starting a gearengaging procedure while simultaneously controlling the electric machine towards obtaining zero torque by the time of completion of the gearengaging procedure;

f) controlling the electric machine to apply requested propulsion system torque on the input shaft of the gearbox, wherein step a) is performed in parallel with steps b)-f), g) moving the locking mechanism to a locking position when the rotational speed of the first component connected to the output shaft of the combustion engine has reached the rotational speed of the input shaft of the gearbox; and h) controlling the electric machine and the combustion engine to apply the torque requested from each of them on the input shaft of the gearbox.

2. A method according to claim 1, further comprising:

during performing of the step d) calculating the time until the synchronized rotational speed of the input shaft of the gearbox has been obtained, comparing the calculated time with an expected time consumption for the gearengaging procedure, and starting the gearengaging procedure in step e) when the calculated time is equal to or has become shorter than the time consumption.

3. A method according to claim 1, further comprising performing the method with a vehicle having the propulsion system with the sun gear as the first component and the ring gear as the third component.

4. A method according to claim 1, further comprising in step d), applying a constant torque using the electric machine applied on the input shaft of a gearbox.

5. A method according to claim 1, further comprising:

starting the method when the vehicle is driving forward with the locking mechanism in the locking position, and comprising the following steps carried out before the step a):

1) controlling the electric machine, for obtaining a torque balance in the planetary gear, to produce a first torque corresponding to the product of the propulsion system torque requested and the transmission ratio of the planetary gear and at the same time controlling the combustion engine to produce a second torque towards obtaining a total zero torque applied on the input shaft of a gearbox, and 2) moving the locking mechanism to the releasing position when torque balance exists in the planetary gear.

6. A method according to claim 1, wherein the sun gear and the planet wheel carrier are interlocked by the locking mechanism in the step g).

7. A method according to claim 1, wherein the step a) comprises calculating for the existing speed of the vehicle the rotational speed which the input shaft of the gearbox would have if the gear of the gearbox which is to be engaged would be engaged.

8. A computer program product comprising a non-transitory data storing medium readable by a computer, a computer program comprising computer program code stored on the data storing medium in which the computer program code of the computer program brings a computer to implement a method according to claim 1 when the computer program code is executed in the computer.

9. An electronic control unit of a motor vehicle comprising an automated data processor, a memory connected to the automated data processor and a non-transitory data storing medium, in which computer code of a computer program is stored on the data storing medium, wherein the program code is configured to cause the electronic control unit to implement a method according to claim 1 when the computer program code is executed in the electronic control unit.

10. A vehicle comprising an electronic control unit according to claim 9.

11. The method according to claim 1, wherein the locking mechanism is a splined locking mechanism.

* * * * *